United States Patent

[11] 3,599,211

[72] Inventor Austin Mardon
       Santa Barbara, Calif.
[21] Appl. No. 785,063
[22] Filed Dec. 16, 1968
[45] Patented Aug. 10, 1971
[73] Assignee Aerojet-General Corporation
       El Monte, Calif.

[54] RADIOMETRY SYSTEM
     2 Claims, 7 Drawing Figs.
[52] U.S. Cl. ................................... 343/100,
                                              250/83.3
[51] Int. Cl. .................................. G01j 5/10,
                                              G01k 11/00
[50] Field of Search............................ 343/100;
                                              250/83.3

[56] References Cited
UNITED STATES PATENTS
3,028,596  4/1962  McGillem et al. ............  343/100
3,230,532  1/1966  Whitney ......................  343/100
3,235,731  2/1966  Seling ........................  343/100 UX Primary Examiner—Rodney D Bennett, Jr.
Assistant Examiner—T. H. Tubbesing
Attorneys—Edward O. Ansell, D. Gordon Angus and Arthur Dicker ABSTRACT: This disclosure relates to a system for detecting metal in a background of terrain or water. It employs a radiometric receiver with input port means directed toward the area to be examined and responsive to thermal emission in two planes of polarization. The system includes means for displaying or comparing the relative emission temperatures in the two planes as an indication of the presence or absence of metal. Fundamentally, the system supresses false alarms due to water.

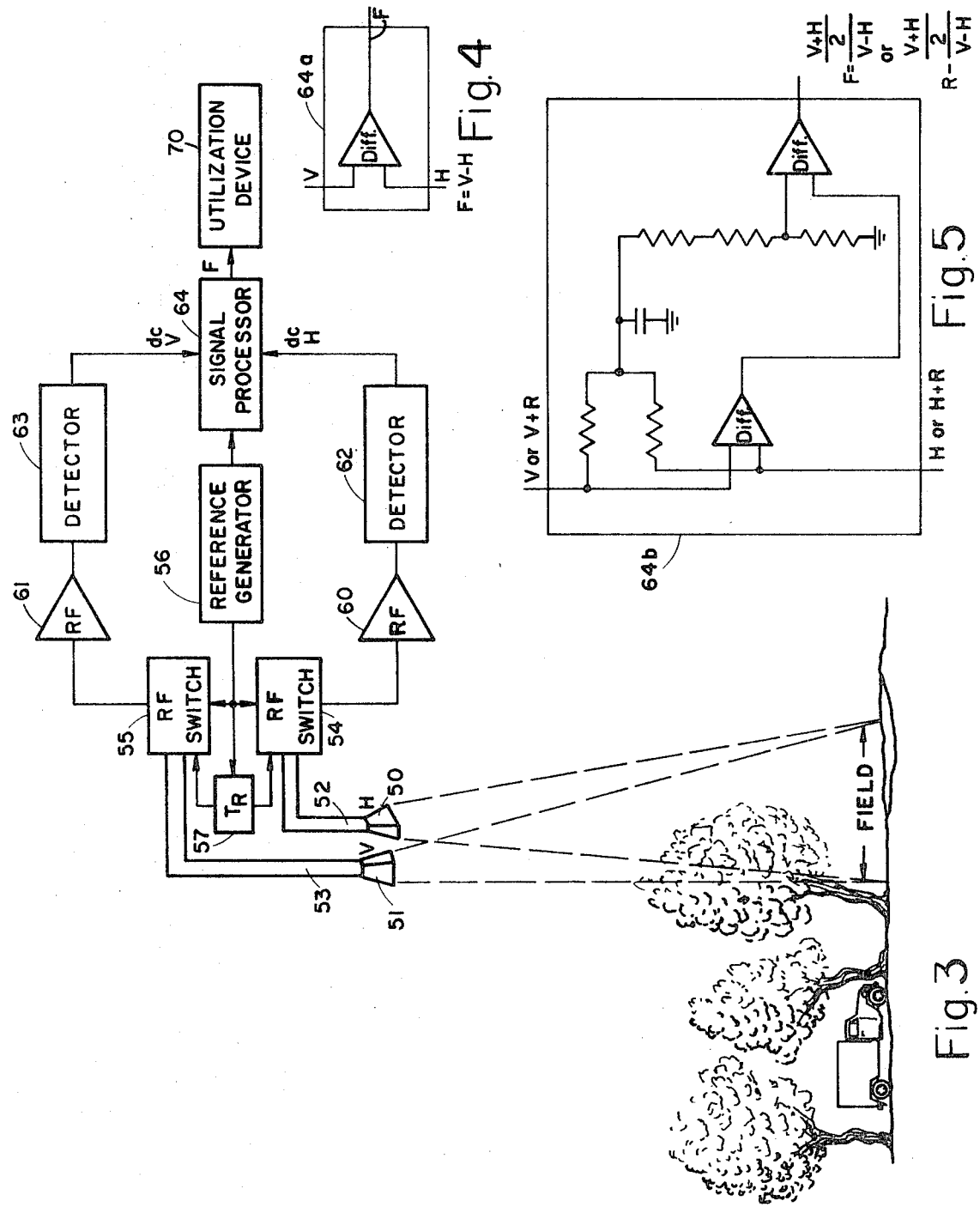

RADIOMETRY SYSTEM

BACKGROUND OF THE INVENTION

The microwave radiometer has been recognized for many years as effective in measuring the emissivities of objects or materials in the field of the radiometer antenna. The microwave radiometer is in actuality an ultrasensitive electromagnetic receiver which responds to thermal energy generated by all materials above absolute zero. Through the years numerous researchers have cataloged the emissivities of different materials under different conditions and this data has been published. In general, the emissivity coefficient at microwave frequencies varies from approximately 0.05 to 0.3 for water and metal, while normal terrain features such as earth, gravel, grass, wood or asphalt have emissivities that range between 0.65 and unity with most of the latter materials in the 0.95 to 0.98 range. As a result, water and metal when viewed by a radiometer, appear as "cold" target while other terrain features appear relatively "hot."

Most radiometers in use are of the type commonly referred to as the Dicke radiometer or signal modulated radiometers. They are based upon the teaching of Professor Dicke in his article, "The Measurement of Thermal Radiation at Microwave Frequencies," *The Review of Scientific Inst.*, Vol. 17, No. 7, July 196, Pg. 268. Basically, the Dicke or signal modulated radiometric receiver is one including a radio frequency switch between the antenna or input port and the receiver. The switch alternately applies the antenna output and a reference load of known emissivity or temperature to the input of the receiver. The reference input is used to cancel any receiver gain instability. In accordance with the teaching of Professor Dicke, it is possible to continuously calibrate the radiometer receiver performance against the known standard and thereby to be able to obtain certain absolute data relative to the field of view of the antenna.

SUMMARY OF THE INVENTION

I have determined that often the absolute emissivity or temperature of the field of view is of less significance to the observer than anomalies which may appear in the field. Anomalies of the most obvious type are those features which appear to be cold in a hot background or vice versa. For example, in navigational applications, common visual landmarks are bodies of water. From the data previously gathered and monitored above, it is clear that water constitutes a cold target while soil, vegetation and many manmade structures appear as hot targets. I have, therefore, determined that a radiometer designed to look at the surfaces of the earth as from an aircraft can produce usable navigational information in areas containing significant amounts of water features. Moreover, I have determined that it is possible, not only to discriminate between hot and cold targets, but that it is possible to discriminate between two types of cold targets which are of particular significance in the navigational and/or military operations. Specifically, it is possible to discriminate between bodies of water and metal in which both appear as cold targets. This is accomplished in accordance with this invention by means of a radiometer which is capable of receiving energy in two discrete polarizations identified for clarity as horizontal and vertical. It has been determined that the emissivity of metal, a cold target, is virtually the same in both horizontal and vertical polarization planes. However, water targets, by way of contrast, have a different apparent temperature in the horizontal and vertical polarities. In particular, in the horizontal polarization plane, water targets appear cold like metal. However, water appears somewhat warmer in the vertical polarization plane. This discrimination is accomplished by use of a radiometer simultaneously or sequentially viewing the field in the horizontal and vertical polarization planes. Suitable switching circuitry is provided whereby the apparent temperatures of the same field in both the vertical and horizontal planes is represented or identified. Where the vertical and horizontal polarized energy of a cold target is at the same apparent temperature, the target can be identified as metal.

Based upon the above recognition, I have designed radiometer systems capable of distinguishing metal from nonmetallic targets in the presence of other natural or manmade materials.

In one embodiment of this invention, a single polarized port or antenna is mounted to view the required field and rotated about the viewing axis to present alternately horizontal and vertically polarized views of the field. Synchronized with the rotating port or antenna is switching circuitry to discriminate between information obtained in each polarization. A recorder or display continuously records or shows the apparent temperature detected. An observer can readily distinguish when a cold target exhibits no significant difference in the horizontal and vertical plane indicative of the presence of a metal object in the field of view. For convenience, this embodiment of the invention is identified as a single channel time multiplexed dual polarization system.

In another embodiment of this invention (which requires additional electronic circuitry and stabilization, but eliminates the rotating apparatus) a pair of polarized antennae or ports is used, each connected through a separate channel. The output of each antenna is simultaneously or sequentially processed to detect signal content and then compared in an electronic computer or signal processor with the significant relationship between the horizontal and vertical components displayed.

Description of the Drawing

This invention may be more clearly understood from the following detailed description and by reference to the drawing in which:

FIG. 3 is a block diagram of a dual channel radiometer designed to distinguish between metal and nonmetallic objects; and FIGS. 4 and 5 are forms of signal processor 64 of FIG. 3.

DETAILED DESCRIPTION OF the INVENTION

Figure 1:
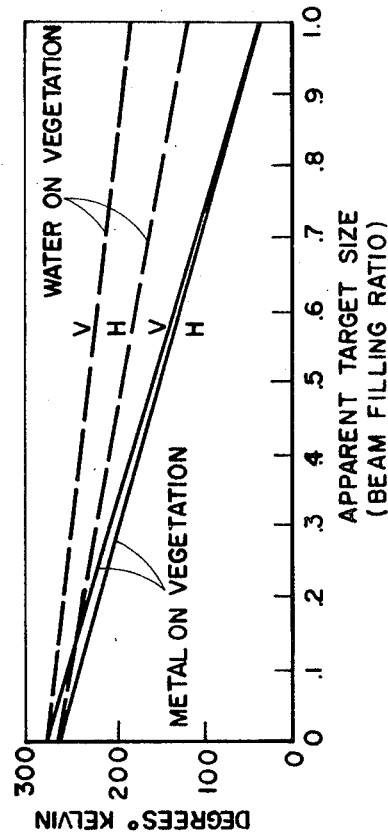
FIG. 1a is a tabular representation of the emissivity of various materials.
FIG. 1b is a tabular representation of the apparent temperatures of similar materials as subject to examination in different planes of polarization.
FIG. 1c is a graphical representation of the temperature of metal and water targets in different polarizations as a function of apparent target size.

Now, referring to the drawing FIG. 1a the emissivity of different materials at microwave frequency is represented. It may be seen that salt water, fresh water, and metallic objects tend to have lower emissivity in the range of 0.05 to 0.3 and, therefore, are categorized as "cold" targets. This is true throughout the frequency range of approximately 10 to 100 GHz. Similarly, organic materials plus natural terrestrial structures, tend to have emissivities significantly higher in the range of 0.65 to unity and, therefore, are considered as "hot" targets.

The difference in emissivities their these materials affect their apparent temperatures when viewed by a microwave radiometer. For the case of a theoretical black body, it will emit radiation as a smooth function of wavelength and its apparent temperature will be the same as measured by a thermometer. Real objects of different materials and surface conditions are not perfect black bodies so their emission is a function of both thermometric temperatures and emissivity. The emissivity by definition equals 1 minus the materials reflectively so that we find highly reflective surfaces such as exposed metal and still water appearing very cold, efficiently reflecting the cold sky.

Normal terrain materials, b rock, sand and vegetation have emissivities which vary widely depending on moisture content, compactness and the material as may be seen in FIG. 1a. However, the emissivity of all of these materials is significantly higher than water and metal. The effect is apparent from FIG. 1b where the apparent temperatures of a number of materials as measured at 17 GHz. is tabulated. These measurements were made on materials out-of-doors exposed to a cold sky and viewed from an incident angle of 22° from the vertical.

Referring to the first numerical column of FIG. 1b, it is apparent that metal and water have apparent temperatures of 100°—200° cooler than vegetation, soil and asphalt. Therefore a radiometric system which will detect this difference in apparent temperature can distinguish between water or metal as cold targets and vegetation, soil, or other materials as hot targets.

The first numerical column was measured with a radiometer in which the port responds to energy in only one plane of polarization. The second numerical column records the apparent temperature in a plane normal to the first plane. For purposes of convenience these are labeled the horizontal H and vertical V planes using the orientation of the antenna ports as the plane of reference. Note that in all cases except metal the apparent temperature of the materials is lower in the horizontal than in the vertical plane. The difference in the case of water is in the order of 50° when the target fills the antenna aperture This characteristic is also illustrated graphically in FIG. 1c with both metal and water targets viewed against a background of vegetation. The ordinate axis of FIG. 1c records apparent temperature in degrees Kelvin and the abscissa, the apparent target size to the viewing port. This apparent target size, of course, is a function of target actual size, antenna port size and target range.

From FIG. 1c it is apparent that metal targets appear somewhat colder than water in the vegetation background at all significant target sized (0.3 and up) but more important is the insensitivity of metal to polarization plane of viewing. This is denoted by the nearly coincident horizontal and vertical curves for metal and divergent horizontal and vertical lines for water.

Based upon the foregoing I have devised a system for distinguishing metal targets in backgrounds of water, vegetation or other materials.

Figure 2:
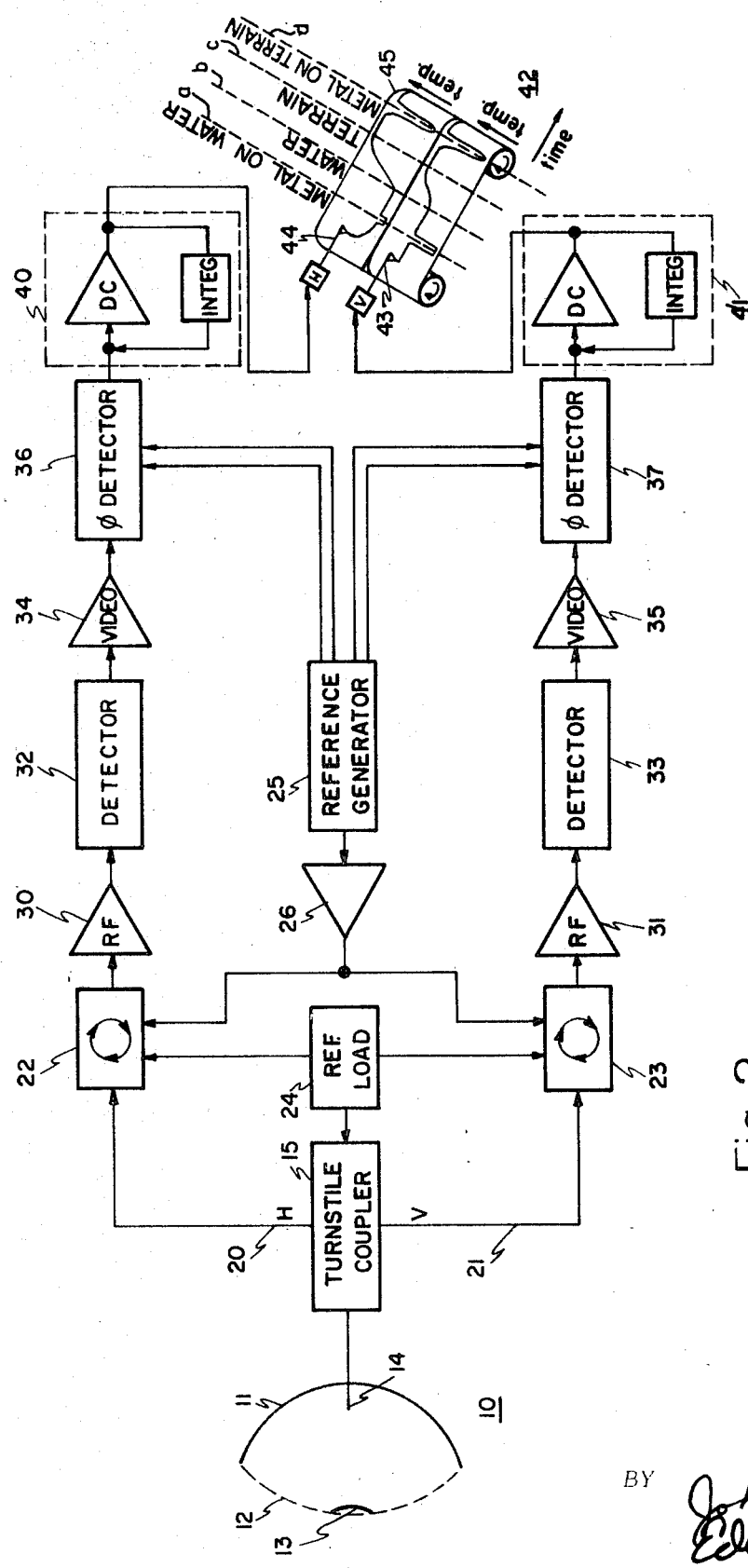
FIG. 2 is a block diagram of a single channel time multiplexed radiometer in accordance with this invention.

In FIG. 2, a block diagram of a system in accordance with this invention may be seen. It includes a single Cassegrainian antenna 10 with a major reflector 11, for example 36 or 48 inches in diameter with a suitable radome 12 shown in dashed lines, a subreflector 13 and a receiving port 14 at the focus of the antenna 10. The port 14 is rectangular and sensitive to energy in one plane of polarization.

The antenna 10 or at least the port 14 is mounted for rotation about the axis of the antenna. The port 14 is electrically coupled through a turnstile junction 15 to sample the horizontal and vertical components through leads 20 or 21 to respective circulator switches 22 and 23 which serve as radio frequency modulators. The switches are conventional ferrite type circulators having a forward insertion loss in the order of one-fourth of a db. and greater than 25 db. in the reverse direction to maintain isolation.

The circulator switches alternately sample the incoming vertical or horizontal component signal as the Hz. may be and a reference load 24 which may be a matched coaxial load held at Y. constant temperature for example 333°K±0.1° K. The temperature of the reference load is preferably monitored continuously by a precision platinum thermometer which output is used to regulate the heater temperature and thereby provide a constant temperature environment for the reference load 24.

The circulator switches 22 and 23 are driven by a common 600 Hz. generator 25 through a power amplifier 26 providing their synchronized switching at the 600 Hz. rate. The vertical and horizontal components alternating with the reference signal are introduced into respective RF amplifiers 30 and 31 which preferably consist of three tunnel diode stages each with the total gain in the order of 48 db. and a measured signal-to-noise figure of less than 6db. The outputs of the tunnel diode amplifiers 30 and 31 are then introduced into respective diode detectors 32 and 33 and then into low noise video amplifiers 34 and 35 providing gain in the order of 60 db. sufficient to drive synchronous demodulators including phase detectors 36 and 37 driven in synchronism with the circulator switches by the 600 Hz. reference generator. These video amplifiers preferably consist of two cascaded stages with sufficient feedback to stabilize the amplifier AC gain and DC characteristics due to aging or environment. Amplifiers having a bandwidth in the order of 30 to 600 Hz. and a noise fig. of less than 4db. will provide suitable video amplification function.

The composite signals are synchronously demodulated by phase detectors 36 and 37 and the varying DC output of each channel is amplified in operational amplifiers 40 and 41 and applied as the input signal to a dual channel chart recorder 42. Two pens 43 and 44 print traces of the apparent temperature of the field of view in the vertical and horizontal polarization planes side by side or if preferred overlying each other. Temperature is measured transverse to the direction of movement of the chart 45.

There may be seen on the chart 45, the simplified representation of a short continuous observation run with two pens transcribing generally parallel paths with two anomaly recorded. The first anomaly appears along the reference line "a" where (1) both traces are in the lower or "cold" region and (2) the vertical polarization component appears at the same temperature as the horizontal polarization component. In accordance with the criteria set forth above, this is indicative of a metal target. The water background is typified by the region "b." The region designated by reference "c" has a higher apparent temperature indicative of land mass or vegetation. At position reference "d" a cold object is present in a hot background. Again the vertical polarization component is of equal temperature with its horizontal counterpart again indicative of the presence of metal against a natural background, in this case terrain or vegetation, in all probability,. The system as described above employs a skilled operator who continuously monitors the traces and visually distinguishes between hot and cold targets while comparing the relative level in the H and V planes of cold targets to detect the presence of water.

This system is fully effective. However, the observation and analysis steps can also be performed automatically employing electrical circuitry of well-known design and with the elimination of operator fatigue. Additionally the elimination of mechanical parts can be advantageous. Both of these advantages are described in the system of FIG. 3.

Now referring to FIG. 3 a pair of antenna ports 50 and 51 may be seen, polarized and oriented normal to each other and carried on a vehicle, (unshown in the drawing) to scan a common field. A typical carrying vehicle for the system is a helicopter for aerial reconnaissance or surveillance.

The two polarized antennae are connected via wave guides 52 and 53 or equivalent to respective radio frequency switches 54 and 55 each driven by a common reference signal generator 56 in opposite phase. The horizontally polarized signal from antenna 50 is applied through switch 54 to an RF amplifier 60 and detector 62 to a signal processor 64. Similarly the vertical component sensed by antenna 51 is applied through switch 55 and an RF amplifier 61 and detector 63 to the same signal processor 64. The reference generator may include a temperature reference R or may simply provide a switching operation depending upon the type of signal processing to be used.

The input signals to the processor 64 are preferably unidirectional voltages varying as a function of the apparent temperature of the field as viewed. The signal processor 64 may combine the input signals in a variety of ways using well-known electronic techniques to perform mathematical transformation to derive the significant information from the two channels. The simplest transformation is the subtraction of the H from the V component. This is the same operation which the operator using the apparatus of FIG. 2 performs mentally. It can be accomplished by a simple differential 64a shown in FIG. 4 which may be substituted for the box 64 of FIG. 3.

To minimize the effects of change in background levels a more sophisticated form of signal processing may be used. This is illustrated by the network 64b of FIG. 5. In this case the average of the horizontal and vertical polarization components $V+H/2$ is derived and divided by the difference $V-H$. Using this form of processing not only is the effect of average level variations minimized but the significant variable, namely, the $V-H$ factor is in the denominator. As $V-H$ approaches zero, the quotient approaches infinity. This relationship $$F = \frac{\frac{V+h}{2}}{V-H}$$

may be implemented by circuit 64b.

Even a further refinement of the system and sophisticated processing can be obtained using the circuit of 64b where the reference generator 56 not only switches alternatively between the H and V ports but a temperature reference 57 as well. In such a case where the input signals are V+R and H-R the output signal is $$F = R - \frac{\frac{V+H}{2}}{V-H}$$

The advantage in the use of these more sophisticated forms of data processing is apparent in FIG. 1b in the right-hand column as compared with the column $V-H$. Given the measurements $V$ and $H$ as they appear in the two columns to the left of the double lines the extraction of the difference value $V-H$ shows a detectable difference between the characteristics of metal as compared to water and other terrain features. However, all $V-H$ factors are in one or two orders of magnitude ranging from 0 for metal to 56 for water to 7 for vegetation or soils. Processed in the manner shown in the two right-hand columns of FIG. 1b the distinction between metal and all other materials is of such magnitude that a fixed threshold of alarm can be built into the data processor to signal metal detection with minimum danger of false alarms.

The signal processor is connected to a utilization device 70 which may be a recorder of the type shown in FIG. 2 or simply an alarm. In some cases it may be advisable to feed the output of this system into a navigational or other type of system for control of the vehicle.

I claim:

1. In a radiometer system in which signals are derived representing emissivities of a surface with regard to different sensing polarizations, means to minimize the effect of variations in target background emissivity on the signals, comprising:

first means to generate a signal representing the average of the derived signals;

second means to generate a signal representing the difference between the derived signals; and means to generate a signal representing the quotient of the signals generated by said first and second means.

2. The system of claim 1 and means to generate a signal representing the emissivity of a reference target; and means to combine the reference signal with the derived signals to provide input for said first and second means.